Jan. 29, 1929.
J. A. GUAY
1,700,492
CLUTCH PLATE
Filed Sept. 10, 1925
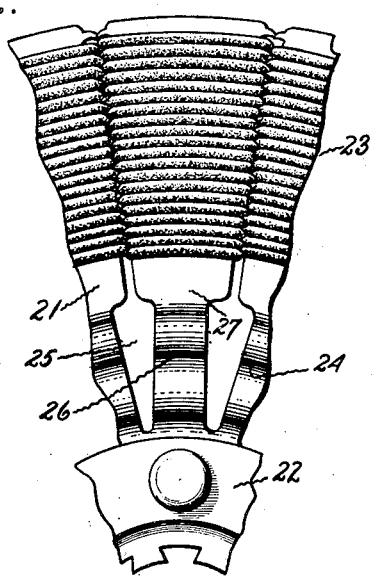
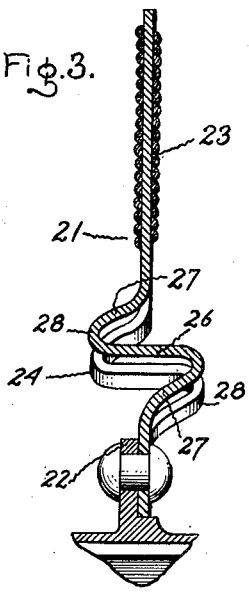
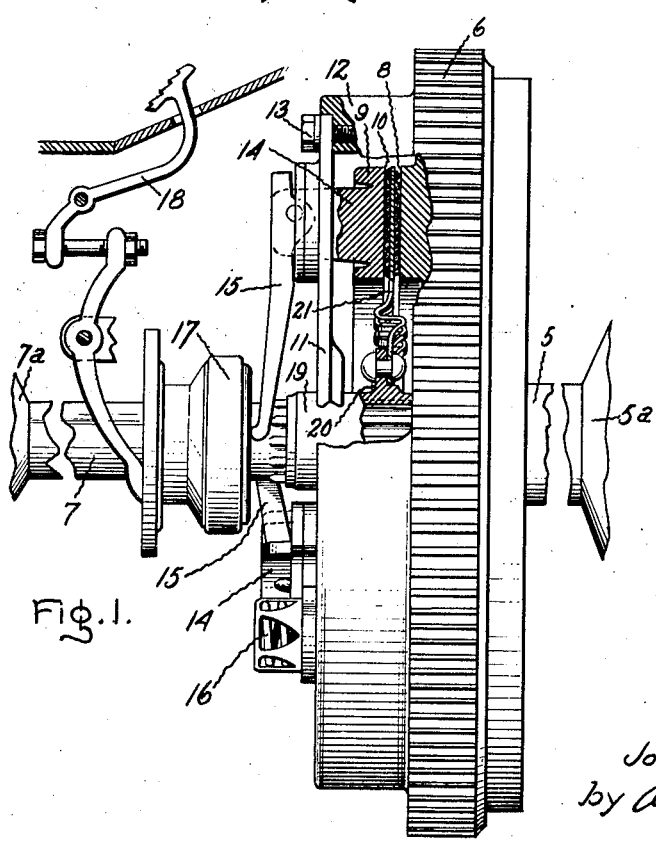
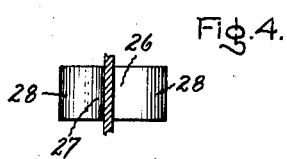
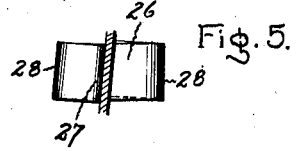
Inventor:
Joseph A. Guay.
by Alfred V. Bobst
His Attorney.

Patented Jan. 29, 1929.

1,700,492

UNITED STATES PATENT OFFICE.

JOSEPH ARTHUR GUAY, OF LYNN, MASSACHUSETTS, ASSIGNOR TO CHRISTOPHER HAIGH, OF WINTHROP, MASSACHUSETTS.

CLUTCH PLATE.

Application filed September 10, 1925. Serial No. 55,424.

In the usual automobile construction, the engine drives the propeller shaft through the intermediary of a friction clutch, and the propeller shaft, in turn, drives the wheels of the automobile through a differential gearing. It has been found in actual practice, that unless the gears of the differential are cut very accurately and aligned perfectly, vibrations are set up which result in certain noises being caused, and since perfect cutting of the gears and perfect alignment are not obtained usually, such noises are present in most automobiles or develop in time. Certain of these vibrations are caused by the angular velocities of the meshing gears not being perfectly correct while others are caused by misalignment of the gears. Vibrations thus set up are transmitted through the propeller shaft and clutch to the fly wheel of the engine and from thence find their way to the body of the car where they develop into objectionable noise.

To overcome the above trouble it is now known to provide in the transmission mechanism a clutch plate or clutch plates which are so constructed and arranged that they are to a limited extent flexible or yieldable in a circumferential direction whereby they serve to absorb such vibrations and prevent their transmission to the fly wheel.

The object of my invention is to provide an improved construction of clutch plate for use in a transmission mechanism which clutch plate is flexible or yieldable in a circumferential direction to an extent sufficient to overcome the above difficulty and is at the same time capable of being manufactured at low cost and of giving long service in actual use.

For a consideration of what I believe to be novel and my invention, attention is directed to the accompanying description and the claims appended thereto.

In the drawing, Fig. 1 is a side elevation, partly in section, of a transmission mechanism having a clutch plate embodying my invention; Fig. 2 is a face view of a segment of the clutch plate; Fig. 3 is a radial sectional view of a clutch plate, and Figs. 4 and 5 are detail views illustrating the operation of the device.

Referring to the drawing, 5 indicates the crank shaft of an automobile engine 5ª, 6 the fly wheel carried thereby, and 7 the propeller shaft which extends through the speed-changing gear box back to the differential gearing 7ª, through which the wheels are driven. On the fly wheel is a friction surface 8 and adjacent thereto is a ring 9 having a cooperating friction surface 10. Friction ring 9 is carried by and driven by a cover plate 11 which is attached to a flange 12 on the fly wheel by a ring of studs 13. The connection of ring 9 to cover plate 11 is through the intermediary of a plurality of posts 14 on the ring which project through openings in the plate and have operating arms 15 connected to them at their outer ends. Between ring 9 and cover plate 11 are a number of springs 16 which serve to force ring 9 towards the fly wheel. On the driven shaft 7 is a member 17 adapted to be moved by a foot pedal 18 to force the inner ends of arms 15 inward and thus move clutch ring 9 away from friction surface 8 to throw the clutch "out". Splined on driven shaft 7 is a sleeve 19 having a flange 20 to which is attached a clutch plate 21 embodying my invention, and which may be considered as comprising a hub portion 22, a friction surfaced portion 23 and a web portion 24 connecting them. The portion 23 may have a friction facing of any suitable material and is the part of the clutch plate which goes between the friction surface 8 on the fly wheel and that on ring 9.

The general clutch structure arrangement so far described is shown only by way of example and is to be taken as typical of any suitable clutch construction. The operation of such structures is well understood by those skilled in this art. For the purpose of illustrating my invention, I have shown a clutch construction invented by me and one which forms the subject matter of my application Ser. No. 52,407, filed August 25, 1925. This clutch construction is described in detail and claimed in such application. My present invention may be utilized in connection with a transmission mechanism embodying a clutch construction of this specific structure or of any other suitable structure.

Now, according to my invention, I form the web of the clutch plate of a plurality of circumferentially-spaced spokes or connecting members which while being sufficiently rigid to transmit the torque between the driving and driven shafts, are at the same time flexible or yieldable in a circumferential direction an amount which enables the clutch plate to absorb vibrations. The spokes or connecting members are formed preferably integral with the hub and friction surfaced portion of the clutch plate and in order to render them yieldable and to give long life to them, I form each with a reversely bent portion whereby there is provided a part which extends to opposite sides of the plane of the clutch plate and about which the bending takes place. This I consider an important feature of my invention for by such arrangement repeated movements of the connecting members can take place without fatiguing the metal and causing it to break.

In the preferred embodiment of my invention, the spokes or connecting members are formed by cutting suitable radially-extending openings in the web of the clutch plate, after which the metal remaining is reversely bent on itself to the desired form.

Referring specifically to the drawing, the spokes or connecting members are formed by cutting openings 25 in the web of the clutch plate. Each spoke or connecting member has a portion 26 which extends transversely of the plane of the clutch plate and is joined to the remaining portion of the spoke or connecting member by portions 27. Portions 26 and 27 are joined by rounded corners as is indicated at 28. With this arrangement, when the friction surfaced portion 23 and the hub portion 22 move circumferentially relatively to each other, the movement takes place as a bending action at the rounded corners 28, the portions 26 and 27 moving parallel relatively to each other. This is illustrated in Figs. 4 and 5. In Fig. 4, the portions 26 and 27 are shown in their normal positions, the portions 27 being directly in alignment with portion 26. In Fig. 5, there is illustrated the positions the portions assume when relative circumferential movement takes place between the frictioned surfaced portion 23 and the hub portion 22. From an inspection of Fig. 5 it will be seen that the upper portion 27 has twisted downward slightly as viewed in the drawing relatively to portion 26, the movement having taken place around the left hand corner 28 and that the lower or under portion 27 has twisted upward slightly as viewed in the drawing relatively to portion 26, the movement having taken place around the right hand corner 28. In this way, the movement takes place without appreciably stressing the metal so that practically no strain is placed on it. It will be appreciated of course, that but a small amount of movement takes place in actual practice. The life of the clutch plate will be affected little if any by reason of the construction.

The spokes or connecting members have a width and the transverse portions 26 have a length such as to give the desired strength for the driving connection and the desired amount of flexibility.

By my invention, I provide a clutch plate which embodies the desired amount of flexibility, in a circumferential direction and which has a long life so that it performs its intended function in a satisfactory manner. In addition, however, a clutch plate embodying my invention has the further and very important advantage that it can be manufactured at a cost but little greater than that of an ordinary clutch plate.

A clutch plate embodying my invention has the advantage also that because of its inherent flexibility it will take care of any misalignments between the driving and driven members.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A clutch plate comprising a hub portion, a friction surfaced portion, and a plurality of circumferentially-spaced members connecting them, said members being reversely bent on themselves transversely of the plane of the plate.

2. A clutch plate having its web provided with a plurality of spaced openings to form radially extending spokes, said spokes being reversely bent on themselves transversely of the plane of the plate whereby the clutch plate is rendered yieldable in a circumferential direction.

3. A clutch plate having its web provided with a plurality of spaced openings the material between such openings being bent reversely on itself to provide a portion which extends transversely of the plane of the clutch plate.

4. A clutch plate comprising a hub portion, a friction surfaced portion, circumferentially-spaced members which extend transversely of the said portions, each member having at least one end which projects beyond the plane of said friction surfaced portion, and means connecting the ends of said members to said portions.

In witness whereof, I have hereunto set my hand this 5 day of Sept., 1925.

JOSEPH ARTHUR GUAY.